(12) United States Patent
Fujimoto (10) Patent No.: US 8,600,946 B2
(45) Date of Patent: Dec. 3, 2013

(54) CONTENT REPRODUCING SYSTEM AND CONTENT REPRODUCING METHOD

(75) Inventor: Munehiko Fujimoto, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1338 days.

(21) Appl. No.: 11/949,263

(22) Filed: Dec. 3, 2007

(65) Prior Publication Data

US 2008/0133544 A1 Jun. 5, 2008

(30) Foreign Application Priority Data

Dec. 1, 2006 (JP) ................................ 2006-325919

(51) Int. Cl.
*G06F 7/00* (2006.01)
*G06F 17/00* (2006.01)

(52) U.S. Cl.
USPC .......................................... 707/652; 707/914

(58) Field of Classification Search
USPC ................................. 707/652, 914
See application file for complete search history.

(56) References Cited

U.S. PATENT DOCUMENTS

| | | | |
|---|---|---|---|
| 5,452,435 A * | 9/1995 | Malouf et al. ................ | 713/500 |
| 6,188,439 B1 * | 2/2001 | Kim ................ | 348/553 |
| 6,208,326 B1 * | 3/2001 | Frederick et al. ................ | 345/690 |
| 6,263,502 B1 * | 7/2001 | Morrison et al. ................ | 725/47 |
| 6,813,619 B2 * | 11/2004 | Devara ................ | 707/999.01 |
| 6,853,387 B2 * | 2/2005 | Evanicky et al. ................ | 345/690 |
| 6,924,843 B1 * | 8/2005 | Yamazaki et al. ................ | 348/423.1 |
| 6,999,129 B2 * | 2/2006 | Shirahama et al. ................ | 348/553 |
| 7,057,667 B1 * | 6/2006 | Mori et al. ................ | 348/554 |
| 7,068,263 B2 * | 6/2006 | Evanicky et al. ................ | 345/207 |
| 7,148,929 B1 * | 12/2006 | Mori et al. ................ | 348/553 |
| 7,151,572 B2 * | 12/2006 | Shirahama et al. ................ | 348/554 |
| 7,405,742 B2 * | 7/2008 | Evanicky et al. ................ | 345/690 |
| 7,667,770 B2 * | 2/2010 | Kondo et al. ................ | 348/441 |
| 7,853,122 B2 * | 12/2010 | Miura et al. ................ | 725/10 |
| 2002/0143771 A1 * | 10/2002 | Devara ................ | 707/10 |
| 2003/0058202 A1 * | 3/2003 | Evanicky et al. ................ | 345/82 |
| 2004/0013398 A1 * | 1/2004 | Miura et al. ................ | 386/46 |
| 2005/0157298 A1 * | 7/2005 | Evanicky et al. ................ | 356/416 |
| 2006/0168126 A1 * | 7/2006 | Costa-Requena et al. .... | 709/219 |
| 2006/0179109 A1 * | 8/2006 | Ko ................ | 709/203 |
| 2006/0190974 A1 | 8/2006 | Lee | |
| 2006/0232576 A1 * | 10/2006 | Evanicky et al. ................ | 345/207 |
| 2006/0282850 A1 * | 12/2006 | Kim ................ | 725/38 |

(Continued)

FOREIGN PATENT DOCUMENTS

| | | |
|---|---|---|
| JP | 2002-288690 A | 10/2002 |
| JP | 2004-304429 A | 10/2004 |
| JP | 2005-175779 A | 6/2005 |

(Continued)

OTHER PUBLICATIONS

Japanese Office Action dated Jul. 12, 2011 with English translation (seven (7) pages).

*Primary Examiner* — Kimberly Wilson (74) *Attorney, Agent, or Firm* — Crowell & Moring LLP (57) ABSTRACT

Disclosed is a reproduction apparatus including a server apparatus to distribute contents and a reproduction section to reproduce the contents distributed by the server apparatus, wherein a storage section included in the server apparatus stores set information pertaining to setting of a predetermined adjustment parameter related to a reproduction of content with respect to each of the contents distributable by the server apparatus; and the reproduction section reproduces the content on the basis of the set information stored in the storage section in the content distributed by the server apparatus.

8 Claims, 5 Drawing Sheets

(56) References Cited

U.S. PATENT DOCUMENTS

| | | | |
|---|---|---|---|
| 2007/0078959 A1* | 4/2007 | Ye | 709/223 |
| 2007/0081101 A1* | 4/2007 | Diederiks et al. | 348/602 |
| 2007/0273714 A1* | 11/2007 | Hodge et al. | 345/690 |
| 2007/0281742 A1* | 12/2007 | Young et al. | 455/557 |
| 2008/0055228 A1* | 3/2008 | Glen | 345/102 |
| 2009/0051711 A1* | 2/2009 | Evanicky et al. | 345/690 |
| 2009/0160621 A1* | 6/2009 | Canu et al. | 340/10.5 |
| 2009/0183622 A1* | 7/2009 | Parash | 84/610 |

FOREIGN PATENT DOCUMENTS

| | | |
|---|---|---|
| JP | 2005-242667 A | 9/2005 |
| JP | 2005-328443 A | 11/2005 |
| JP | 2006-221646 A | 8/2006 |
| JP | 2006-236324 A | 9/2006 |
| JP | 2006-246358 A | 9/2006 |

* cited by examiner

CONTENT REPRODUCING SYSTEM AND
CONTENT REPRODUCING METHOD

BACKGROUND OF THE INVENTION

1. Field of the Invention

The present invention relates to a content reproducing system and a content reproducing method.

2. Description of Related Art

In earlier development, a system including a server apparatus to distribute content, a reproduction apparatus to reproduce the distributed content, and the like, has been proposed.

To put it concretely, for example, as a content reproducing system that include a client terminal to reproduce content and a server apparatus to transmit the content to the client terminal, proposed was a content reproducing system which can display a screen in a client terminal (see, for example, Japanese Patent Application Laid-Open Publication No. 2006-246358). In the screen, the image of a piece of content having the maximum value of the display weight, which indicates the priority of the display of the content, among the display weights of a plurality of pieces of content is disposed in the main screen and the images of the other pieces of content are disposed in sub-screens.

Moreover, for example, as a home network system that includes a video-on-demand server to supply video-on-demand content service, proposed was a home network system in which a home server connected to the video-on-demand server and at least one device existing in a home (see, for example, Japanese Patent Application Laid-Open Publication No. 2006-236324). In the proposed home network system, the home server can specify a device to which a user is approaching by tracking the position of the user; the video-on-demand server can convert content so as to be adapted to the specified device; and the home server can transmit the converted content to the specified device.

Moreover, for example, as a home server that stores content, proposed was a home server which can convert an audio (A)/video (V) file format of a piece of content demanded to be reproduced into an A/V file format that can be reproduced by a connected peripheral device when the A/V file format of the content that is demanded to be reproduced does not accord with the A/V file format that can be decoded by the connected peripheral device (see, for example, Japanese Patent Application Laid-Open Publication No. 2006-221646).

Moreover, for example, as a home server capable of sharing content with the other connected home servers, proposed was a home server which can select another home server to supply a desired piece of content on the basis of the distributing image rate of each of a plurality of home servers when the desired piece of content is stored in the other plurality of home servers (see, for example, Japanese Patent Application Laid-Open Publication No. 2005-328443).

In the meantime, a user sometimes has to set a predetermined parameter (for example, luminance, reddish hue, brightness, and sharpness, if content include video data) at the time of making a reproduction apparatus reproduce the content.

However, the optimum setting sometimes changes every piece of content, and there is a problem of troublesome for a user to perform setting every piece of content individually. The techniques disclosed in the above patent publications cannot solve the problem.

SUMMARY OF THE INVENTION

It is an object of the present invention to provide a content reproducing system and a content reproducing method, both capable of reproducing content under the optimum setting for the content.

According to a first aspect of the invention, there is provided a content reproducing system, comprising:

a server apparatus to distribute contents including video data;

a reproduction apparatus including a reproduction section to reproduce the contents distributed by the server apparatus; and a control apparatus to control the server apparatus and the reproduction apparatus, wherein the server apparatus includes:

a storage section to store set information pertaining to setting of a predetermined adjustment parameter related to reproduction of content with respect to each of the contents distributable by the server apparatus; and a position information transmitting section to transmit save position information pertaining to a save position of the contents and storage position information pertaining to a storage position of the set information in the storage section to the control apparatus, wherein the control apparatus includes:

a selection section to allow a selection of a piece of content among the contents distributable by the server apparatus;

a set information obtaining section to obtain set information of the content selected on the selection section from the server apparatus on the basis of the storage position information transmitted by the position information transmitting section;

an instruction section to allow the reproduction apparatus to reproduce the content selected on the selection section on the basis of the set information of the content;

a set information transmitting section to transmit the set information obtained by the set information obtaining section to the reproduction apparatus when the instruction section allows to reproduce the content selected by the selection section on the basis of the set information of the content; and a save position information transmitting section to transmit save position information of the content selected on the selection section to the reproduction apparatus among the save position information transmitted by the position information transmitting section, wherein the reproduction apparatus includes a distribution request transmitting section to transmit a distribution request to request a distribution of the content selected on the selection section to the server apparatus together with the save position information transmitted by the save position information of the content transmitting section, wherein the server apparatus includes a content distributing section to obtain the content to distribute the obtained content to the reproduction apparatus according to the distribution request transmitted by the distribution request transmitting section and the save position information transmitted together with the distribution request, and wherein the reproduction section reproduces the content distributed by the content distributing section on the basis of the set information when the set information is transmitted by the set information transmitting section, and the predetermined adjustment parameter includes at least one of luminance, reddish hue, brightness, and sharpness.

According to a second aspect of the invention, there is provided a content reproducing method for a reproduction apparatus including a server apparatus to distribute contents and a reproduction section to reproduce the contents distributed by the server apparatus, comprising:

storing by a storage section included in the server apparatus set information pertaining to setting of a predetermined adjustment parameter related to a reproduction of content with respect to each of the contents distributable by the server apparatus; and reproducing by the reproduction section the content on the basis of the set information stored in the storage section in the content distributed by the server apparatus.

According to a third aspect of the invention, there is provided a content reproducing system, comprising:

a server apparatus to distribute contents;

a reproduction apparatus including a reproduction section to reproduce the contents distributed by the server apparatus; and a control apparatus to control the server apparatus and the reproduction apparatus, wherein the server apparatus includes:

a storage section to store set information pertaining to setting of a predetermined adjustment parameter related to reproduction of content with respect to each of the contents distributable by the server apparatus; and a position information transmitting section to transmit save position information pertaining to a save position of the contents and storage position information pertaining to a storage position of the set information in the storage section to the control apparatus, wherein the control apparatus includes:

a selection section to allow a selection of a piece of content among the contents distributable by the server apparatus;

set information obtaining section to obtain set information of the content selected on the selection section from the server apparatus on the basis of the storage position information transmitted by the position information transmitting section;

a set information transmitting section to transmit the set information obtained by the set information obtaining section to the reproduction apparatus; and a save position information transmitting section to transmit save position information of the content selected on the selection section to the reproduction apparatus, among the save position information transmitted by the position information transmitting section, wherein the reproduction apparatus includes a distribution request transmitting section to transmit a distribution request to request a distribution of the content selected on the selection section to the server apparatus together with the save position information transmitted by the save position information of the content transmitting section, wherein the server apparatus includes a content distributing section to obtain the content to distribute the obtained content to the reproduction apparatus according to the distribution request transmitted by the distribution request transmitting section and the save position information transmitted together with the distribution request, and wherein the reproduction section reproduces the content distributed by the content distributing section on the basis of the set information transmitted by the set information transmitting section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

In the following, the best modes of the content reproducing system and the content reproducing method by the content reproducing system according to the present invention will be described in detail with reference to the attached drawings. Incidentally, the scope of the invention is not limited to the shown examples.

<Configuration of Content Reproducing System>

Figure 1:
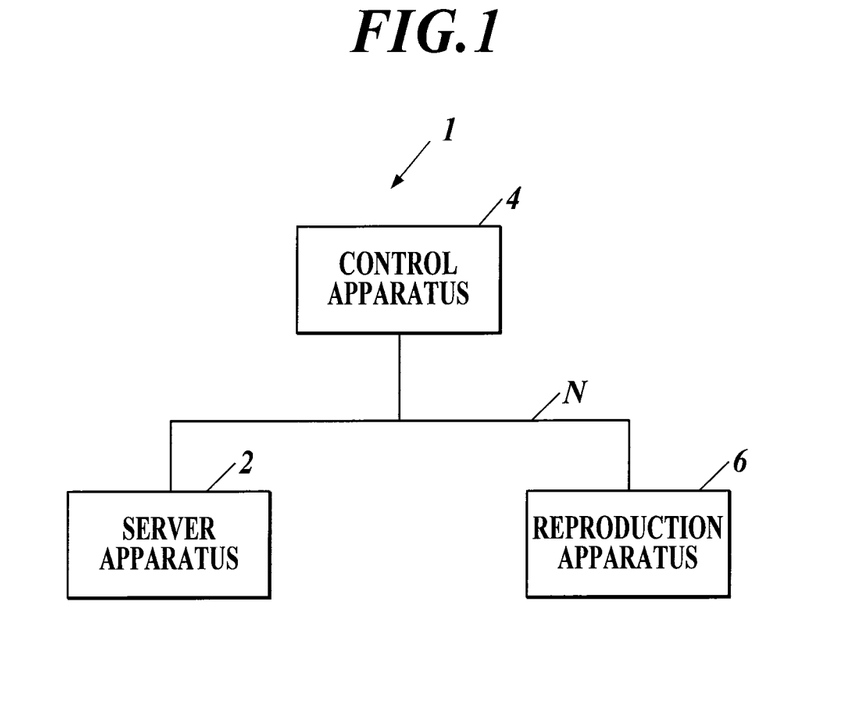
FIG. 1 is a diagram showing the configuration of a content reproducing system according to the present invention.

A content reproducing system 1 is composed of, for example, a server apparatus 2 to distribute content, a reproduction apparatus 6 including a reproduction section 62 to reproduce the content distributed by the server apparatus 2, and a control apparatus 4 to control the server apparatus 2 and the reproduction apparatus 6, as shown in FIG. 1.

The content reproducing system 1 is, for example, the so-called home network system, and, for example, the server apparatus 2, the control apparatus 4, and the reproduction apparatus 6 are mutually connected by a network N, such as a local area network (LAN).

The server apparatus 2, the control apparatus 4, and the reproduction apparatus 6 are, for example, apparatus mounted with Universal Plug and Play (UPnP) Audio/Video and dealing with Digital Living Network Alliance (DLNA) guide lines.

(Server Apparatus)

Figure 2:
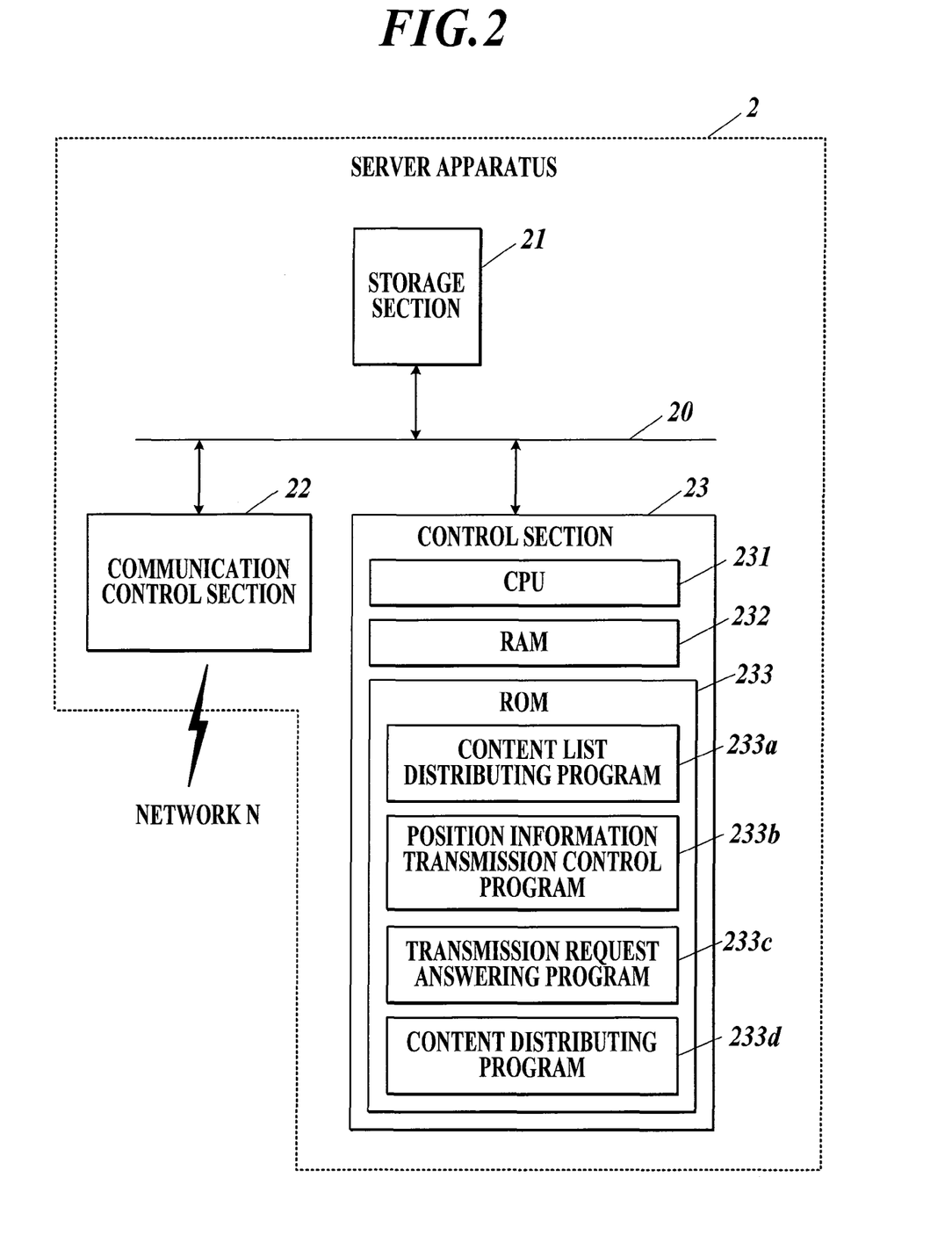
FIG. 2 is a block diagram showing the functional configuration of the server apparatus of FIG. 1.

The server apparatus 2 is the so-called digital media server, such as a hard disk drive (HDD)/digital versatile disk (DVD) recorder, and is composed of, for example, a storage section 21, a communication control section 22, and a control section 23, as shown in FIG. 2. Each section is mutually connected through a bus 20.

The storage section 21 is composed of, for example, a HDD or a DVD. The storage section 21 saves, for example, content, and stores set information pertaining to the setting of a predetermined adjustment parameter pertaining to the reproduction of the content every piece of content distributable by the server apparatus 2, that is, every piece of content stored in, for example, the storage section 21, as a storage section.

To put it concretely, the content stored in the storage section 21 includes, for example, video data and sound data.

Moreover, the predetermined adjustment parameter is, for example, the so-called rendering parameter, and includes, for example, luminance, reddish hue, brightness, sharpness, and the like.

Moreover, the set information stored in the storage section 21 includes, for example, a value of an adjustment parameter that is proposed by a content provider providing the content as the optimum one. Consequently, when the content is reproduced on the basis of the set information stored in the storage section 21, a user can watch the content under the conditions of luminance, reddish hue, brightness, sharpness, and the like that are intended by the content provider of the content.

The content provider is, for example, an image producing company, the maker of the server apparatus 2, or the server apparatus 2 itself here.

Incidentally, the content stored in the storage section 21 does not need to include both of video data and sound data, and it is sufficient to include video data and/or sound data.

Moreover, the predetermined adjustment parameter does not need to include all of the luminance, the reddish hue, the brightness, and the sharpness, and may include at least one of them, and further may include another adjustment parameter.

The communication control section 22 performs the transmission and the reception of various kinds of information with, for example, an external device (such as the control apparatus 4 or the reproduction apparatus 6) through the network N.

To put it concretely, the communication control section 22 transmits, for example, save position information pertaining to the save position of content in the storage section 21 and storage position information pertaining to the storage position of set information in the storage section 21 in conformity with a control signal input from the control section 23 to the control apparatus 4 as a position information transmitting section.

The control section 23 includes, for example, a central processing unit (CPU) 231, a random access memory (RAM) 232, and a read only memory (ROM) 233, as shown in FIG. 2.

The CPU 231 performs various control operations in conformity with various processing programs for the server apparatus 2 stored in, for example, the ROM 233.

The RAM 232 includes, for example, a program storing region for expanding a processing program executed by the CPU 231, and a data storing region for storing input data and a processing result produced at the time of the execution of the processing program.

The ROM 233 stores, for example, a system program executable by the server apparatus 2, various processing programs executable on the system program, the data to be used at the time of the execution of these various kinds of processing program, and the data of the processing result arithmetically processed by the CPU 231. Incidentally, the programs are stored in the ROM 233 in the forms of program codes readable by a computer.

To put it concretely, the ROM 233 stores, for example, a content list distributing program 233a, a position information transmission control program 233b, a transmission request answering program 233c, and a content distributing program 233d, as shown in FIG. 2.

The content list distributing program 233a enables the CPU 231 to realize, for example, the function of distributing a content list tabularizing the information pertaining to the content stored in the storage section 21 to the control apparatus 4 through the communication control section 22 in conformity with a distribution request (described below) transmitted from a communication control section 44 (described below) of the control apparatus 4.

The information pertaining to the content is, for example, the title of the content.

The position information transmission control program 233b enables the CPU 231 to realize, for example, the function of inputting a control signal into the communication control section 22 to make the communication control section 22 transmit the save position information pertaining to a save position of content in the storage section 21, and the storage position information pertaining to a storage position of set information in the storage section 21 to the control apparatus 4.

The transmission request answering program 233c enables the CPU 231 to realize, for example, the function of extracting the set information from the storage section 21 on the basis of the storage position information transmitted together with a transmission request (described below) in conformity with the transmission request transmitted by the communication control section 44 (described below) of the control apparatus 4, and of inputting a control signal into the communication control section 44 to make the communication control section 44 transmit the extracted set information to the control apparatus 4.

The content distributing program 233d enables the CPU 231 to realize, for example, the function of obtaining content from the storage section 21 on the basis of the save position information transmitted together with a distribution request (described below) in conformity with the distribution request transmitted by the communication control section 61 (described below) of the reproduction apparatus 6, and of distributing the obtained content to the reproduction apparatus 6 through the communication control section 44.

The CPU 231 functions as a content distributing section by executing the content distributing program 233d like this.

(Control Apparatus)

Figure 3:
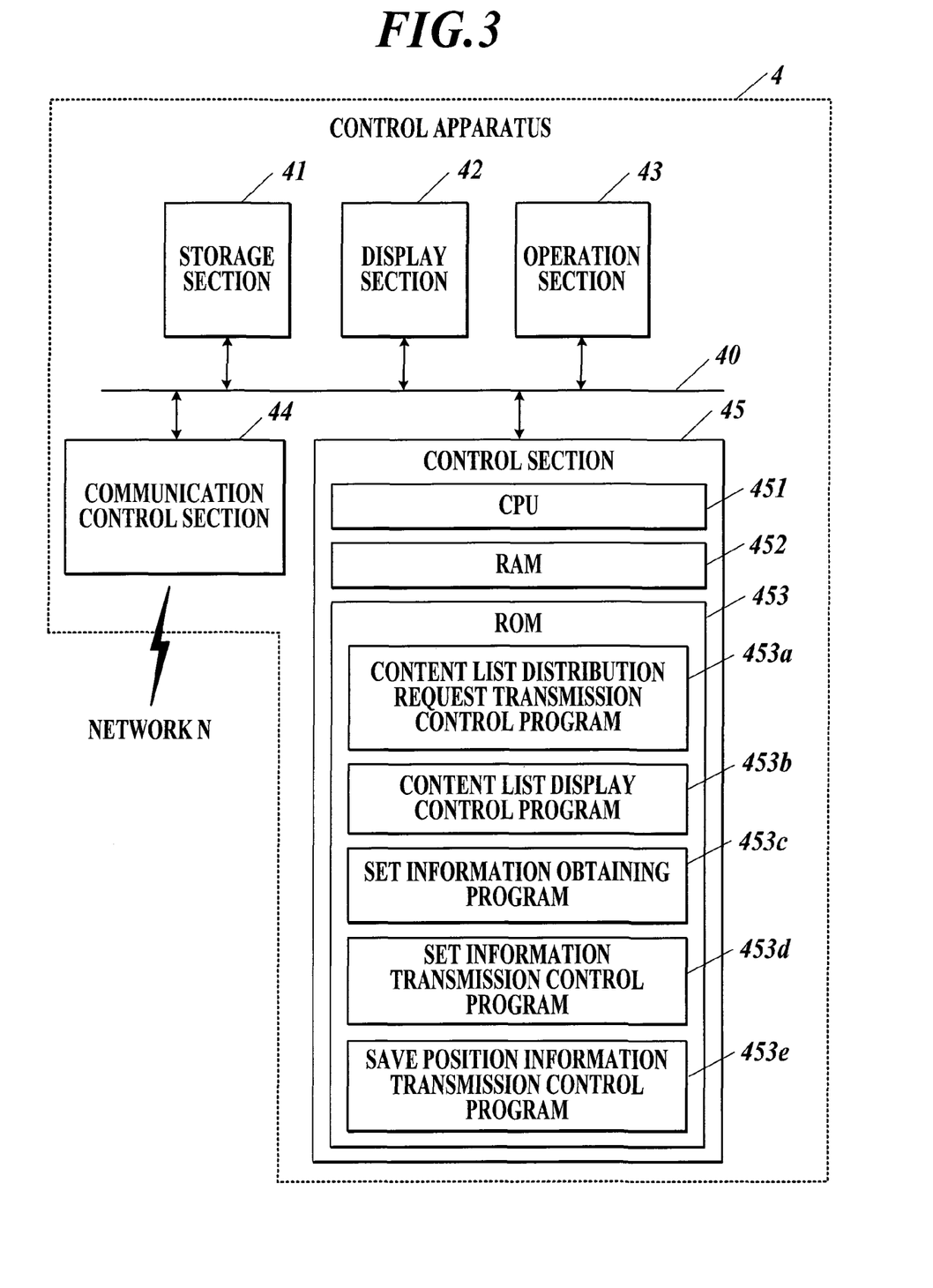
FIG. 3 is a block diagram showing the functional configuration of the control apparatus of FIG. 1.

The control apparatus 4 is the so-called digital media controller, such as a personal digital assistant (PDA), and is composed of, for example, a storage section 41, a display section 42, an operation section 43, the communication control section 44, and a control section 45, as shown in FIG. 3. Each of the sections is mutually connected by a bus 40.

The storage section 41 stores, for example, the set information that has been transmitted by the communication control section 22 of the server apparatus 2 and has been received by the communication control section 44.

To put it concretely, when the set information has been transmitted by the communication control section 22 of the server apparatus 2 and has been received by the communication control section 44, the set information is stored by the storage section 41

The display section 42 is composed of, for example, a liquid crystal display (LCD) panel, and performs, for example, given display processing in conformity with a control signal input from the control section 45.

The operation section 43 is composed of, for example, operation keys disposes on the outer surface of the control apparatus 4, and a touch panel disposed with the display section 42 integrally. When the operation section 43 is operated by, for example, a user, the operation section 43 outputs various signals caused by the operation to the control section 45.

To put it concretely, the operation section 43 is operated, for example, when the user selects a piece of content among the pieces of content distributable by the server apparatus 2, as a selection section.

To put it more concretely, the user selects the piece of content among the pieces of content distributable by the server apparatus 2 by, for example, operating the operation section 43 to select the piece of content in a content list that has been transmitted by the communication control section 22 of the server apparatus 2 and has been displayed on the display section 42.

Moreover, the operation section 43 is operated, for example, when the user instructs the reproduction of the content selected by a user's operation of the operation section 43 as an instruction section on the basis of the set information of the content.

To put it more concretely, the user instructs the reproduction of the content selected by, for example, the user's depression of an "optimum setting" key included in the operation section 43 on the basis of the set information of the content.

The communication control section 44 performs, for example, the transmission and the reception of various kinds of information with an external device (such as the server apparatus 2 or the reproduction apparatus 6) through the network N.

To put it concretely, the communication control section 44 transmits, for example, the set information obtained by a CPU 451 (described below), which has executed a set information obtaining program 453c, to the reproduction apparatus 6 in conformity with a control signal input from the control section 45, as a set information transmitting section.

The communication control section 44 is here configured to transmit the set information obtained by the CPU 451 (described below), which has executed the set information obtaining program 453c, to the reproduction apparatus 6 at the time of being instructed to reproduce the content selected by a user's operation of the operation section 43 on the basis of the set information of the content by, for example, a user's operation of the operation section 43.

Moreover, the communication control section 44 transmits, for example, the save position information of the content selected by a user's operation of the operation section 43 among the pieces of save position information, which have been transmitted by the communication control section 22 of the server apparatus 2, to the reproduction apparatus 6 in conformity with a control signal input from the control section 45 as a save position information transmitting section.

The control section 45 includes, for example, the CPU 451, a RAM 452, and a ROM 453, as shown in FIG. 3.

The CPU 451 performs, for example, various control operations in conformity with various processing programs for the control apparatus 4 stored in the ROM 453.

The RAM 452 includes, for example, a program storing region for expanding the processing programs to be executed by the CPU 451, and a data storing region for storing input data, the processing results to be generated at the time of the execution of the aforesaid processing programs, and the like.

The ROM 453 stores, for example, a system program executable by the control apparatus 4, various processing programs executable on the system program, the data to be used at the time of the execution of these various processing programs, and the data of the processing results arithmetically processed by the CPU 451. Incidentally, the programs are stored in the ROM 453 in the forms of the program codes readable by a computer.

To put it concretely, the ROM 453 stores, for example, a content list distribution request transmission control program 453a, a content list display control program 453b, the set information obtaining program 453c, a set information transmission control program 453d, and a save position information transmission control program 453e, as shown in FIG. 3.

The content list distribution request transmission control program 453a enables the CPU 451 to realize, for example, the function of inputting a control signal into the communication control section 44 to make the communication control section 44 transmit a distribution request to request the server apparatus 2 to distribute a content list tabularizing the information pertaining to the content stored in the storage section 21 of the sever apparatus 2 to the communication control section 44 when a user instructs the CPU 451 to display the content list on the display section 42 by a user's operation of the operation section 43.

The content list display control program 453b enables the CPU 451 to realize, for example, the function of making the display section 42 display the content list distributed from the server apparatus 2.

The set information obtaining program 453c enables the CPU 451 to realize, for example, the function of obtaining the set information of the content selected by a user's operation of the operation section 43 from the server apparatus 2 on the basis of storage position information transmitted by the communication control section 22 of the server apparatus 2, and of making the storage section 41 store the set information.

To put it concretely, the CPU 451 inputs, for example, a control signal into the communication control section 44 to make the communication control section 44 transmit a transmission request to request the transmission of the set information of the content selected by a user's operation of the operation section 43 to the server apparatus 2 together with the storage position information of the set information of the content selected by the user's operation of the operation section 43 among the storage position information transmitted by the communication control section 22 of the server apparatus 2. Because the set information of the content selected by the user's operation of the operation section 43 is hereby transmitted by the communication control section 22 of the server apparatus 2, the CPU 451 can obtain the set information of the content selected by the user's operation of the operation section 43.

The CPU 451 functions as a set information obtaining section by executing the set information obtaining program 453c like this.

The set information transmission control program 453d enables the CPU 451 to realize, for example, the function of inputting a control signal into the communication control section 44 to make the communication control section 44 transmit the set information obtained by the CPU 451, which has executed the set information obtaining program 453c, to the reproduction apparatus 6.

To put it concretely, when the CPU 451 is, for example, instructed to reproduce the content selected by a user's operation of the operation section 43 on the basis of the set information of the content by a user's operation of the operation section 43, the CPU 451 makes the communication control section 44 transmit the set information that has been obtained by the CPU 451, which has executed the set information obtaining program 453c, and has been stored in the storage section 41 to the reproduction apparatus 6.

The save position information transmission control program 453e enables the CPU 451 to realize, for example, the function of inputting a control signal into the communication control section 44 to make the communication section 44 transmit the save position information of the content selected by a user's operation of the operation section 43 among the pieces of save position information transmitted by the communication control section 22 of the server apparatus 2 to the reproduction apparatus 6.

(Reproduction Apparatus)

Figure 4:
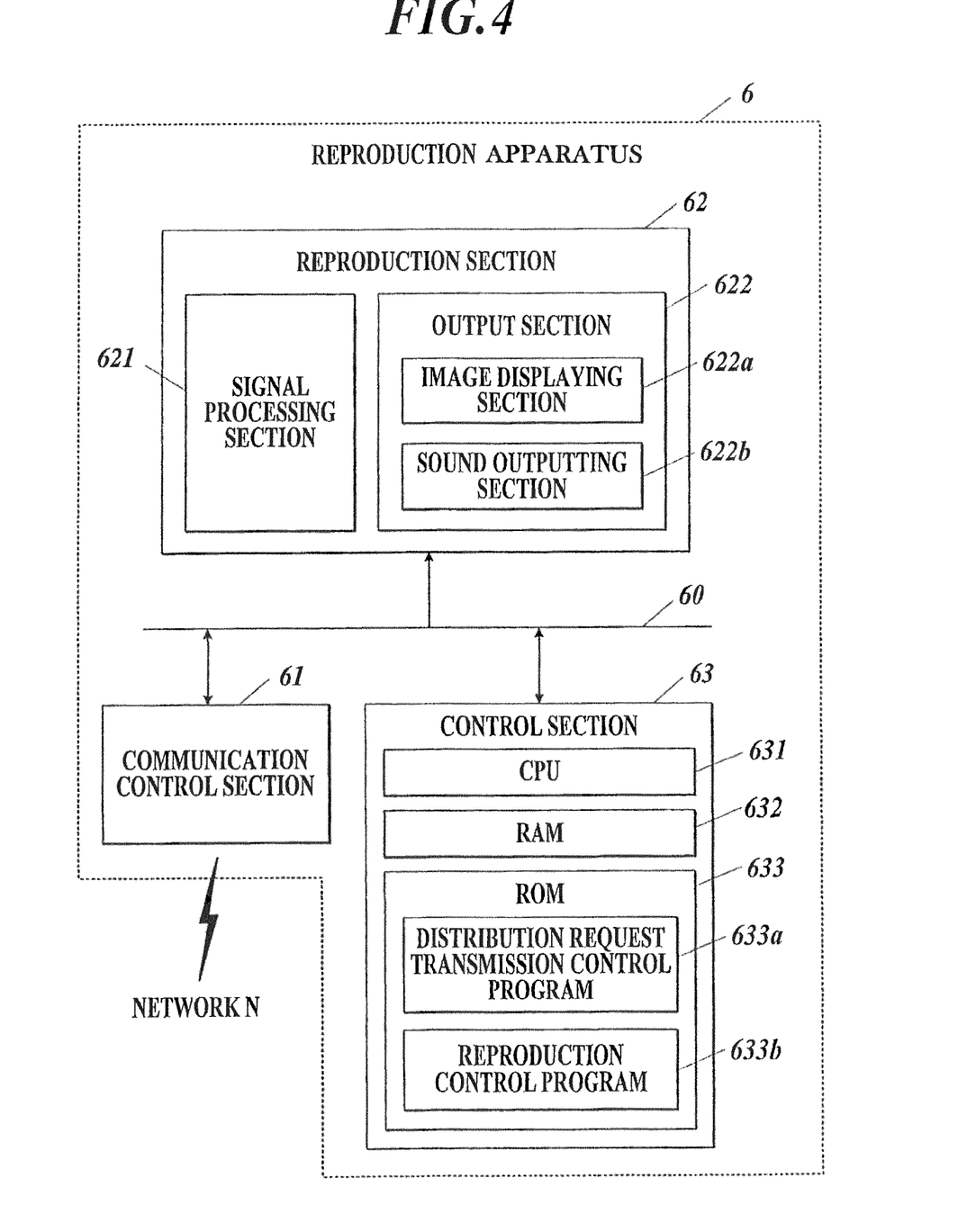
FIG. 4 is a block diagram showing the functional configuration of the reproduction apparatus of FIG. 1.

The reproduction apparatus 6 is the so-called digital media renderer, such as a television receiver, and is composed of, for example, the communication control section 61, the reproduction section 62, and a control section 63, as shown in FIG. 4. Each of the sections is mutually connected by a bus 60.

The communication control section 61 performs, for example, the transmission and the reception of various kinds of information with an external device (such as the server apparatus 2 or the control apparatus 4) through the network N.

To put it concretely, the communication control section 61 transmits, for example, a distribution request to the server apparatus 2 in conformity with a control signal input from the control section 63, as a distribution request transmitting section. The distribution request requests the server apparatus 2 to distribute the content selected by a user's operation of the operation section 43 of the control apparatus 4 to the reproduction apparatus 6 together with the save position information transmitted by the communication control section 44 of the control apparatus 4.

The reproduction section 62 reproduces, for example, the content distributed by the CPU 231, which has executed the content distributing program 233d of the server apparatus 2, in conformity with a control signal input from the control section 63, as a reproduction section.

The reproduction section 62 is here configured to reproduce the content distributed by the CPU 231, which has executed the content distributing program 233d of the server apparatus 2, on the basis of the set information, for example, when the set information has been transmitted by the communication control section 44 of the control apparatus 4.

To put it concretely, the reproduction section 62 includes, for example, a signal processing section 621, and an output section 622 including an image displaying section 622a and a sound outputting section 622b, as shown in FIG. 4.

The signal processing section 621 performs, for example, predetermined processing to the content that has been distributed from the server apparatus 2 and has been received by the communication control section 61 in conformity with a control signal input from the control section 63, and separates video data, sound data, and the like, from the content. Then the signal processing section 621 decodes the video data, and outputs the decoded video data to the image displaying section 622a of the output section 622. Furthermore, the signal processing section 621 decodes the sound data, and outputs the decoded sound data to the sound outputting section 622b of the output section 622.

The image displaying section 622a of the output section 622 is, for example, a liquid crystal display device, and displays, for example, the image based on the video data output by the signal processing section 621 in conformity with a control signal input from the control section 63.

The sound outputting section 622b of the output section 622 is, for example, a speaker device, and outputs, for example, the sound based on the sound data output from the signal processing section 621 in conformity with a control signal input from the control section 63.

The control section 63 includes, for example, a CPU 631, a RAM 632, and a ROM 633, as shown in FIG. 4.

The CPU 631 performs various control operations in conformity with, for example, the various processing programs for the reproduction apparatus 6 which programs are stored in the ROM 633.

The RAM 632 includes, for example, a program storing region for expanding a processing program and the like that are executed by the CPU 631; and a data storing region storing input data, the processing results produced at the time of the execution of the processing program, and the like.

The ROM 633 stores, for example, a system program executable by the reproduction apparatus 6, various processing programs executable on the system program, the data to be used at the time of the execution of these various processing programs, and the data of the processing results arithmetically processed by the CPU 631. Incidentally, the programs are stored in the ROM 633 in the forms of the program codes readable by a computer.

To put it concretely, the ROM 633 stores, for example, a distribution request transmission control program 633a and a reproduction control program 633b, as shown in FIG. 4.

The distribution request transmission control program 633a enables the CPU 631 to realize, for example, the function of inputting a control signal into the communication control section 61 to make the communication control section 61 transmit a distribution request to the server apparatus 2 together with the save position information transmitted by the communication control section 44 of the control apparatus 4. The distribution request requests the server apparatus 2 to distribute the content selected by a user's operation of the operation section 43 of the control apparatus 4 to the reproduction apparatus 6.

The reproduction control program 633b enables the CPU 631 to realize, for example, the function of inputting a control signal into the reproduction section 62 to make the reproduction section 62 reproduce the content distributed by the CPU 231, which has executed the content distributing program 233d of the server apparatus 2.

For example, when set information is here transmitted to the CPU 631 by the communication control section 44 of the control apparatus 4, the CPU 631 makes the reproduction section 62 reproduce the content distributed by the CPU 231, which has executed the content distributing program 233d of the server apparatus 2, on the basis of the set information. When no set information has been transmitted yet to the CPU 631 by the communication control section 44 of the control apparatus 4, the CPU 631 makes the reproduction section 62 reproduce the content distributed by the CPU 231, which has executed the content distributing program 233d of the server apparatus 2, on the basis of a previously set given adjustment parameter.

<Content Reproducing Processing>

Figure 5:
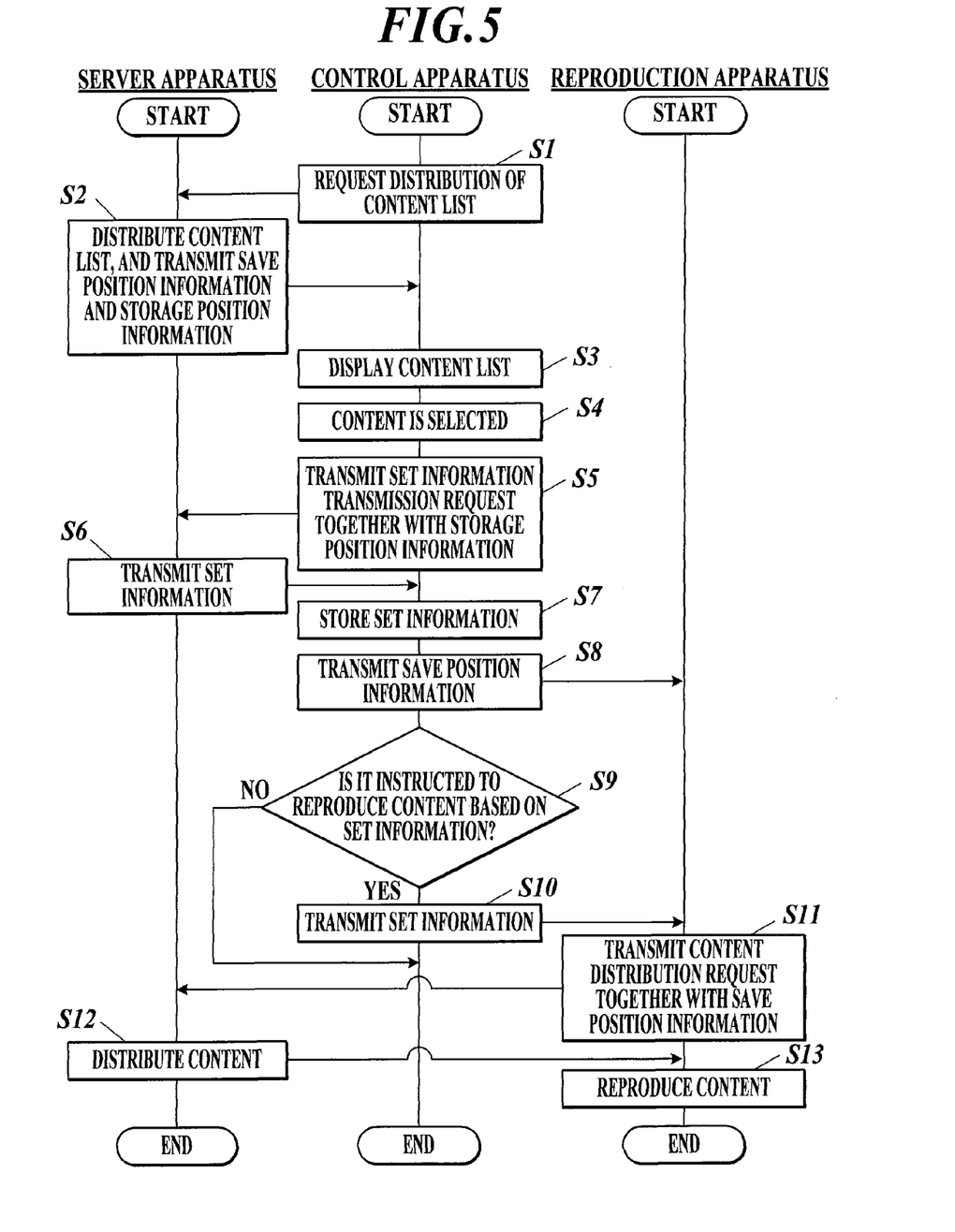
FIG. 5 is a flow chart for illustrating the processing pertaining to the reproduction of content by the content reproducing system according to the present invention.

The processing pertaining to the reproduction of content by the content reproducing system 1 is described with reference to the flow chart of FIG. 5.

When the CPU 451 of the control apparatus 4 is first instructed to display a content list tabularizing the information pertaining to the content stored in the storage section 21 of the sever apparatus 2 on the display section 42 by a user's operation of the operation section 43, the CPU 451 executes the content list distribution request transmission control program 453a, and inputs a control signal into the communication control section 44 to make the communication control section 44 transmit a distribution request to request the server apparatus 2 to distribute the content list to the server apparatus 2 (Step S1).

When the communication control section 22 receives the distribution request transmitted at Step S1, the CPU 231 of the server apparatus 2 executes the content list distributing program 233a to distribute the content list to the control apparatus 4 through the communication control section 22 in conformity with the distribution request transmitted at Step S1, and executes the position information transmission control program 233b to make the communication control section 22 transmit the save position information pertaining to the save position of the content in the storage section 21 and the storage position information pertaining to the storage position of the set information in the storage section 21 to the control apparatus 4 (Step S2).

The information pertaining to the content in the content list, the save position information pertaining to the save position of the content, and the storage position information pertaining to the storage position of the set information of the content are here set to be transmitted to the control apparatus 4 in the state of being associated with one another.

When the communication control section 44 receives the content list distributed at Step S2, and the save position information and the storage position information, which have been transmitted at Step S2, the CPU 451 of the control apparatus 4 executes the content list display control program 453b to make the display section 42 display the content list distributed at Step S2 on the display section 42 (Step S3).

When a piece of content is selected in the content list displayed at Step S3 by a user's operation of the operation section 43 (Step S4), the CPU 451 executes the set information obtaining program 453c to input a control signal into the communication control section 44. Then, the CPU 451 makes the communication control section 44 transmit a transmission request to the server apparatus 2. The transmission request requests the sever apparatus 2 to transmit the set information of the content selected at Step S4 to the control apparatus 4 together with the storage position information of the set information of the content selected at Step S4 among the pieces of the storage position information transmitted at Step S2 (Step S5).

When the communication control section 22 receives the transmission request transmitted at Step S5, the CPU 231 of the server apparatus 2 executes the transmission request answering program 233c to extract the set information from the storage section 21 on the basis of the storage position information transmitted together with the transmission request in conformity with the transmission request transmitted at Step S5, and inputs a control signal into the communication control section 44 to make the communication control section 44 transmit the extracted set information to the control apparatus 4 (Step S6).

When the communication control section 44 receives the set information transmitted at Step S6, the CPU 451 of the control apparatus 4 makes the storage section 41 store the set information transmitted at Step S6 (Step S7).

Next, the CPU 451 executes the save position information transmission control program 453e, and inputs a control signal into the communication control section 44 to make the communication control section 44 transmit the save position information of the content selected at Step S4 among the pieces of save position information transmitted at Step S2 to the reproduction apparatus 6 (Step S8).

Next, the CPU 451 judges whether the CPU 451 has been instructed to reproduce the content selected at Step S4 on the basis of the set information of the content by a user's operation of the operation section 43 or not (Step S9).

When the CPU 451 judges that the CPU 451 is not instructed to reproduce the content selected at Step S4 on the basis of the set information of the content by a user's operation of the operation section 43 at Step S9 (Step S9; No), the CPU 451 ends the present processing.

On the other hand, when the CPU 451 judges that the CPU 451 is instructed to reproduce the content selected at Step S4 on the basis of the set information of the content by a user's operation of the operation section 43 at Step S9 (Step S9; Yes), the CPU 451 executes the set information transmission control program 453d, and inputs a control signal into the communication control section 44 to make the communication control section 44 transmit the set information stored in the storage section 41 at Step S7 to the reproduction apparatus 6 (Step S10). Then, the CPU 451 ends the present processing.

When the communication control section 61 receives the save position information transmitted at Step S8, the CPU 631 of the reproduction apparatus 6 executes the distribution request transmission control program 633a to make communication control section 61 transmit a distribution request to the server apparatus 2 together with the save position information transmitted at Step S8. The distribution request requests the server apparatus 2 to distribute the content selected at Step S4 to the reproduction apparatus 6 (Step S11).

When the communication control section 22 receives the distribution request transmitted at Step S11, the CPU 231 of the server apparatus 2 executes the content distributing program 233d to obtain the content from the storage section 21 on the basis of the save position information transmitted together with the distribution request in conformity with the distribution request transmitted at Step S11, and distributes the obtained content to the reproduction apparatus 6 through the communication control section 22 (Step S12). Then, the CPU 231 ends the present processing.

When the communication control section 61 receives the content distributed at Step S12, the CPU 631 of the reproduction apparatus 6 executes the reproduction control program 633b, and inputs a control signal into the reproduction section 62 to makes the reproduction section 62 reproduce the content distributed from the server apparatus 2 (Step S13). Then the CPU 631 ends the present processing.

At this time, when the set information is transmitted at Step S10 on the basis of the judgment of the existence of the instruction of the reproduction of the content selected at Step S4 on the basis of the set information of the content by a user's operation of the operation section 43 at Step S9, the CPU 631 makes the reproduction section 62 reproduce the content distributed from the server apparatus 2 on the basis of the set information. When it is judged that there is no instruction of the reproduction of the content selected at Step S4 on the basis of the set information of the content by any user's operation of the operation section 43 at Step S9, the CPU 631 makes the reproduction section 62 reproduce the content distributed from the server apparatus 2 on the basis of the previously set given adjustment parameter.

According to the content reproducing system 1 of the present invention described above, the content reproducing system 1 includes the server apparatus 2 to distribute content, the reproduction apparatus 6 having the reproduction section 62 to reproduce the content distributed by the server apparatus 2, and the control apparatus 4 to control the server apparatus 2 and the reproduction apparatus 6. The server apparatus 2 can store the set information pertaining to the setting of a predetermined adjustment parameter related to the reproduction of the content by the storage section 21 every content distributable by the server apparatus 2, that is, every content stored in the storage section 21. The server apparatus 2 can transmit the save position information pertaining to the save position of the content in the storage section 21 and the storage position information pertaining to the storage position of the set information in the storage section 21 to the control apparatus 4 by the communication control section 22. The control apparatus 4 can select a piece of content among the pieces of content distributable by the server apparatus 2 by a user's operation of the operation section 43, and can obtain the set information of the content selected by a user's operation of the operation section 43 from the server apparatus 2 on the basis of the storage position information transmitted by the communication control section 22 by the CPU 451, which has executed the set information obtaining program 453c. The control apparatus 4 can transmit the set information obtained by the CPU 451, which has executed the set information obtaining program 453c, to the reproduction apparatus 6 with the communication control section 44, and can transmit the save position information of the content selected by a user's operation of the operation section 43 among the pieces of save position information transmitted by the communication control section 22 to the reproduction apparatus 6 with the communication control section 44. The reproduction apparatus 6 can transmit a distribution request to the server apparatus 2 together with the save position information transmitted by the communication control section 44 with the communication control section 61. The distribution request requests the server apparatus 2 to distribute the content selected by a user's operation of the operation section 43 to the reproduction apparatus 6. The server apparatus 2 can obtain the content and can distribute the obtained content to the reproduction apparatus 6 on the basis of the save position information transmitted together with the distribution request in conformity with the distribution request transmitted by the communication control section 61 by the CPU 231, which has executed the content distributing program 233d. Then, the reproduction section 62 can reproduce the content distributed by the CPU 231, which has executed the content distributing program 233d, on the basis of the set information transmitted by the communication control section 44.

That is, when the storage section 21 of the server apparatus 2 stores, for example, the set information pertaining to the setting of the predetermined adjustment parameter that the content provider providing content proposes as the optimum one, the reproduction section 62 can reproduce the content in the optimum setting.

Consequently, a user can enjoy the content in the optimum setting without performing any troublesome setting operations.

Moreover, the control apparatus 4 includes the operation section 43, which is operated by a user when the user instructs the reproduction of the content selected by a user's operation of the operation section 43 on the basis of the set information of the content, and the communication control section 44 transmits the set information obtained by the CPU 451, which has executed the set information obtaining program 453c, to the reproduction apparatus 6 at the time of being instructed to reproduce the content selected by a user's operation of the operation section 43 on the basis of the set information of the content by a user's operation of the operation section 43. When the set information is transmitted to the reproduction section 62 by the communication control section 44, the reproduction section 62 reproduces the content distributed by the CPU 231, which has executed the content distributing program 233d, on the basis of the set information.

Because the reproduction section 62 can consequently reproduce the content on the basis of the set information stored in the storage section 21 of the server apparatus 2 only when a user desires the reproduction, the userbility thereof is high.

Moreover, the content includes video data, and the predetermined adjustment parameter includes at least one of luminance, reddish hue, brightness, and sharpness.

Because the storage section 21 of the server apparatus 2 consequently stores the set information pertaining to the setting of the predetermined adjustment parameter pertaining to the reproduction of the video data the setting of which is especially troublesome, it is convenient for a user.

Incidentally, the present invention is not limited to the embodiment described above, but the invention can suitably be changed without departing from the spirit and the scope thereof.

The control apparatus 4 and the reproduction apparatus 6 may not be the bodies separated from each other, but may integrally be configured as the so-called digital media player.

The content reproducing system 1 may not be the home network system in which the server apparatus 2, the control apparatus 4, and the reproduction apparatus 6 are mutually connected by a LAN, but, for example, may be a system in which the server apparatus 2, the control apparatus 4, and the reproduction apparatus 6 are mutually connected by the Internet, or, for example, may be a system in which the server apparatus 2 and the control apparatus 4 are mutually connected by the Internet and the server apparatus 2 and the reproduction apparatus 6 are mutually connected by the Internet and further the control apparatus 4 and the reproduction apparatus 6 are mutually connected by a LAN.

In the processing pertaining to the reproduction of content by the content reproducing system 1 (FIG. 5), a user instructs the reproduction of the content on the basis of the set information before the content is distributed, and the control apparatus 4 transmits the set information to the reproduction apparatus 6 in conformity with the instruction, but the timing of the user's instruction of the reproduction of the content on the basis of the set information is arbitrary, and, for example, the user may perform the instruction during the reproduction of the content.

However, the control apparatus 4 is configured not to be able to transmit the set information to the reproduction apparatus 6 in conformity with the instruction only after the set information has been stored in the storage section 41 of the control apparatus 4.

Although the processing is set so that, when a user has instructed the reproduction of content on the basis of the set information, the processing obeys the instruction, the processing may be set to reproduce the content automatically on the basis of the set information without depending on the user's instruction.

Moreover, the set information may be transmitted directly from the server apparatus 2 to the reproduction apparatus 6 without using the control apparatus 4. That is, for example, the storage position information may not be transmitted from the control apparatus 4 to the server apparatus 2, but the storage information may be transmitted from the control apparatus 4 to the reproduction apparatus 6 together with the save position information, and the save position information and the storage position information may be transmitted from the reproduction apparatus 6 to the server apparatus 2, and further the set information may be transmitted from the server apparatus 2 to the reproduction apparatus 6 together with the distribution of the content.

According to a first aspect of the present embodiment, a content reproducing system, comprises: a server apparatus to distribute contents; a reproduction apparatus including a reproduction section to reproduce the contents distributed by the server apparatus; and a control apparatus to control the server apparatus and the reproduction apparatus, wherein the server apparatus includes: a storage section to store set information pertaining to setting of a predetermined adjustment parameter related to reproduction of content with respect to each of the contents distributable by the server apparatus; and a position information transmitting section to transmit save position information pertaining to a save position of the contents and storage position information pertaining to a storage position of the set information in the storage section to the control apparatus, wherein the control apparatus includes: a selection section to allow a selection of a piece of content among the contents distributable by the server apparatus; set information obtaining section to obtain set information of the content selected on the selection section from the server apparatus on the basis of the storage position information transmitted by the position information transmitting section; a set information transmitting section to transmit the set information obtained by the set information obtaining section to the reproduction apparatus; and a save position information transmitting section to transmit save position information of the content selected on the selection section to the reproduction apparatus, among the save position information transmitted by the position information transmitting section, wherein the reproduction apparatus includes a distribution request transmitting section to transmit a distribution request to request a distribution of the content selected on the selection section to the server apparatus together with the save position information transmitted by the save position information of the content transmitting section, wherein the server apparatus includes a content distributing section to obtain the content to distribute the obtained content to the reproduction apparatus according to the distribution request transmitted by the distribution request transmitting section and the save position information transmitted together with the distribution request, and wherein the reproduction section reproduces the content distributed by the content distributing section on the basis of the set information transmitted by the set information transmitting section.

That is, when the storage section of the server apparatus stores, for example, the set information pertaining to the setting of the predetermined adjustment parameter that the content provider to provide the content proposes as the optimum one, the content can be reproduce in the optimum setting.

The user can consequently enjoy the content in the optimum setting without performing any troublesome setting operations.

Preferably, the control apparatus includes an instruction section to allow the reproduction apparatus to reproduce the content selected on the selection section on the basis of the set information of the content, the set information transmitting section transmits the set information obtained by the set information obtaining section to the reproduction apparatus when the instruction section allows a reproduction of the content selected by the selection section on the basis of the set information of the content, and the reproduction section reproduces the content distributed by the content distributing section on the basis of the set information when the set information is transmitted by the set information transmitting section.

Because the content can consequently be reproduced on the basis of the set information stored in the storage section of the server apparatus only when the user desired the reproduction, the usability thereof is high.

Preferably, the content includes video data, and the predetermined adjustment parameter includes at least one of luminance, reddish hue, brightness, and sharpness.

Because the storage section of the server apparatus consequently stores the set information pertaining to the setting of the predetermined adjustment parameter pertaining to the reproduction of video data the setting of which is especially troublesome, it is convenient for the user.

According to a second aspect of the present embodiment, a content reproducing method for a reproduction apparatus including a server apparatus to distribute contents and a reproduction section to reproduce the contents distributed by the server apparatus, comprising: storing by a storage section included in the server apparatus set information pertaining to setting of a predetermined adjustment parameter related to a reproduction of content with respect to each of the contents distributable by the server apparatus; and reproducing by the reproduction section the content on the basis of the set information stored in the storage section in the content distributed by the server apparatus.

That is, when the storage section of the server apparatus stores, for example, the set information pertaining to the setting of the predetermined adjustment parameter that the content provider to provide the content proposes as the optimum one, the content can be reproduced by the optimum setting.

The user can consequently enjoy the content in the optimum setting without performing any troublesome setting operations.

The entire disclosure of Japanese Patent Application No. 2006-325919 filed on Dec. 1, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A content reproducing system, comprising:
a server apparatus to distribute contents including video data;
a reproduction apparatus including a reproduction section to reproduce the contents distributed by the server apparatus; and
a control apparatus to control the server apparatus and the reproduction apparatus, wherein
the server apparatus includes:
a storage section to store set information pertaining to setting of a predetermined adjustment parameter related to reproduction of content with respect to each of the contents distributable by the server apparatus; and
a position information transmitting section to transmit save position information pertaining to a save position of the contents and storage position information pertaining to a storage position of the set information in the storage section to the control apparatus, wherein
the control apparatus includes:
a selection section to allow a selection of a piece of content among the contents distributable by the server apparatus;
a set information obtaining section to obtain set information of the content selected on the selection section from the server apparatus on the basis of the storage position information transmitted by the position information transmitting section;
an instruction section to allow the reproduction apparatus to reproduce the content selected on the selection section on the basis of the set information of the content;
a set information transmitting section to transmit the set information obtained by the set information obtaining section to the reproduction apparatus when the instruction section allows to reproduce the content selected by the selection section on the basis of the set information of the content; and
a save position information transmitting section to transmit save position information of the content selected on the selection section to the reproduction apparatus among the save position information transmitted by the position information transmitting section, wherein
the reproduction apparatus includes:
a distribution request transmitting section to transmit a distribution request to request a distribution of the content selected on the selection section to the server apparatus together with the save position information transmitted by the save position information of the content transmitting section, and
an operation section to receive an instruction from a user to reproduce the content on the basis of the set information, wherein
the server apparatus includes a content distributing section to obtain the content to distribute the obtained content to the reproduction apparatus according to the distribution request transmitted by the distribution request transmitting section and the save position information transmitted together with the distribution request, and wherein only if the user provides the instruction to reproduce the content distributed by the content distributing section on the basis of the set information:

the set information transmitting section transmits the set information to the reproduction apparatus, the reproduction apparatus transmits the distribution request to the server apparatus, requesting the distribution of the selected content together with the obtained save position information of the selected content, the server apparatus obtains the content and distributes the content to the reproduction apparatus according to the distribution request and the obtained save position information, and the reproduction section reproduces the content distributed by the content distributing section on the basis of the set information, and wherein the predetermined adjustment parameter includes at least one of luminance, reddish hue, brightness, and sharpness.

2. The content reproducing system according to claim 1, wherein if the user does not provide the instruction to reproduce the content on the basis of the set information, the reproduction section reproduces the content on the basis of a previously set adjustment parameter.

3. A content reproducing method using a reproduction system which includes a server apparatus to distribute contents, a reproduction apparatus to reproduce the contents distributed by the server apparatus, and a control apparatus to control the server apparatus and the reproduction apparatus, the method comprising the steps of:

storing set information pertaining to setting of a predetermined adjustment parameter related to reproduction of content with respect to each of the contents distributable by the server apparatus;

transmitting save position information pertaining to a save position of the contents and storage position information pertaining to a storage position of the set information from the server apparatus to the control apparatus;

selecting a piece of content among the contents distributable by the server apparatus;

obtaining, by the control apparatus, set information of the selected content from the server apparatus on the basis of the transmitted storage position information;

transmitting the save position information of the selected content among the transmitted save position information, from the control apparatus to the reproduction apparatus; and only if a user provides an instruction via the reproduction apparatus to reproduce the content on the basis of the set information:

transmitting the set information from the control apparatus to the reproduction apparatus;

transmitting a distribution request from the reproduction apparatus to the server apparatus, requesting a distribution of the selected content together with the obtained save position information of the selected content;

obtaining the content and distributing the obtained content from the server apparatus to the reproduction apparatus, according to the distribution request and the save position information transmitted together from the reproduction apparatus; and reproducing, by the reproduction apparatus, the obtained content on the basis of the set information transmitted from the control apparatus.

4. The content reproducing method according to claim 3, wherein if the user does not provide the instruction to reproduce the content on the basis of the set information, the reproduction section reproduces the content on the basis of a previously set adjustment parameter.

5. A content reproducing system, comprising:

a server apparatus to distribute contents;

a reproduction apparatus including a reproduction section to reproduce the contents distributed by the server apparatus; and a control apparatus to control the server apparatus and the reproduction apparatus, wherein the server apparatus includes:

a storage section to store set information pertaining to setting of a predetermined adjustment parameter related to reproduction of content with respect to each of the contents distributable by the server apparatus; and a position information transmitting section to transmit save position information pertaining to a save position of the contents and storage position information pertaining to a storage position of the set information in the storage section to the control apparatus, wherein the control apparatus includes:

a selection section to allow a selection of a piece of content among the contents distributable by the server apparatus;

a set information obtaining section to obtain set information of the content selected on the selection section from the server apparatus on the basis of the storage position information transmitted by the position information transmitting section;

a set information transmitting section to transmit the set information obtained by the set information obtaining section to the reproduction apparatus; and a save position information transmitting section to transmit save position information of the content selected on the selection section to the reproduction apparatus, among the save position information transmitted by the position information transmitting section, wherein the reproduction apparatus includes:

a distribution request transmitting section to transmit a distribution request to request a distribution of the content selected on the selection section to the server apparatus together with the save position information transmitted by the save position information of the content transmitting section, and an operation section to receive an instruction from a user to reproduce the content on the basis of the set information, wherein the server apparatus includes a content distributing section to obtain the content to distribute the obtained content to the reproduction apparatus according to the distribution request transmitted by the distribution request transmitting section and the save position information transmitted together with the distribution request, and wherein only if the user provides the instruction to reproduce the content distributed by the content distributing section on the basis of the set information:

the set information transmitting section transmits the set information to the reproduction apparatus, the reproduction apparatus transmits the distribution request to the server apparatus, requesting the distribution of the selected content together with the obtained save position information of the selected content, the server apparatus obtains the content and distributes the content to the reproduction apparatus according to the distribution request and the obtained save position information, and the reproduction section reproduces the content distributed by the content distributing section on the basis of the set information.

6. The content reproducing system according to claim 5, wherein the control apparatus includes an instruction section to allow the reproduction apparatus to reproduce the content selected on the selection section on the basis of the set information of the content, and the set information transmitting section transmits the set information obtained by the set information obtaining section to the reproduction apparatus when the instruction section allows a reproduction of the content selected by the selection section on the basis of the set information of the content.

7. The content reproducing system according to claim 5, wherein the contents include video data, and the predetermined adjustment parameter includes at least one of luminance, reddish hue, brightness, and sharpness.

8. The content reproducing system according to claim 5, wherein if the user does not provide the instruction to reproduce the content on the basis of the set information, the reproduction section reproduces the content on the basis of a previously set adjustment parameter.

* * * * *